US 10,953,907 B2

(12) United States Patent
Wilkins (10) Patent No.: US 10,953,907 B2
(45) Date of Patent: Mar. 23, 2021

(54) PORTABLE SKI COOLER AND METHOD

(71) Applicant: Mike Wilkins, Dallas, GA (US)

(72) Inventor: Mike Wilkins, Dallas, GA (US)

( * ) Notice: Subject to any disclaimer, the term of this patent is extended or adjusted under 35 U.S.C. 154(b) by 0 days.

(21) Appl. No.: 16/289,653

(22) Filed: Feb. 28, 2019

(65) Prior Publication Data

US 2019/0270475 A1  Sep. 5, 2019

Related U.S. Application Data

(60) Provisional application No. 62/637,339, filed on Mar. 1, 2018.

(51) Int. Cl.
| | |
|---|---|
| *B62B 13/18* | (2006.01) |
| *B62B 13/06* | (2006.01) |
| *B62B 1/18* | (2006.01) |
| *B62B 5/06* | (2006.01) |

(52) U.S. Cl.
CPC ............... *B62B 13/18* (2013.01); *B62B 1/18* (2013.01); *B62B 5/067* (2013.01); *B62B 13/06* (2013.01); *B62B 2202/52* (2013.01); *B62B 2204/06* (2013.01)

(58) Field of Classification Search
CPC ........... B62B 13/18; B62B 13/06; B62B 1/18; B62B 5/067; B62B 2204/06; B62B 2202/52
See application file for complete search history.

(56) References Cited

U.S. PATENT DOCUMENTS

| | | | | |
|---|---|---|---|---|
| 88,601 | A | * 4/1869 | Auerbach | B62B 13/18 280/11 |
| 702,677 | A | * 6/1902 | Potter et al. | B62B 13/18 280/9 |
| 1,205,842 | A | * 11/1916 | Belliveau | B62B 13/18 280/11 |
| 1,275,521 | A | * 8/1918 | Bowes et al. | B62B 13/18 280/9 |
| 1,302,426 | A | * 4/1919 | Pearson | B62B 13/18 280/9 |
| 1,343,046 | A | * 6/1920 | Fleckl | B62B 13/18 280/11 |
| 1,450,924 | A | * 4/1923 | Ord | B62B 13/18 280/11 |
| 1,974,163 | A | * 9/1934 | Sentner | B62B 13/18 280/11 |
| 2,428,994 | A | * 10/1947 | Rogers | B62B 13/18 280/11 |

(Continued)

FOREIGN PATENT DOCUMENTS

GB  2568652 A  * 5/2019  ............ B62B 17/00

*Primary Examiner* — Jacob B Meyer
(74) *Attorney, Agent, or Firm* — Runyan Law; Charles Runyan (57) ABSTRACT

A vehicle; the vehicle includes a receptacle, a door, at least one door-hinge, a right-ski, a left-ski, at least one right-hinge, and at least one left-hinge. The receptacle may be a container having four sides, a bottom, and an opening which is covered by the door. The door is hinged to the receptacle by the at least one door-hinge and may be opened or closed manually. The right hinges attach the right-ski to the receptacle, and the left hinges attach the left-ski to the receptacle. In this way, each ski may be folded up against the receptacle, or turned down to be deployed and used.

18 Claims, 5 Drawing Sheets

(56) References Cited

U.S. PATENT DOCUMENTS

| | | | | |
|---|---|---|---|---|
| 2,480,256 A * | 8/1949 | Campbell | | B62B 13/18 |
| | | | | 280/9 |
| 2,518,561 A * | 8/1950 | Meschwitzer | | B62B 13/18 |
| | | | | 280/11 |
| 2,521,330 A * | 9/1950 | Berra | | B62B 13/18 |
| | | | | 280/11 |
| 2,615,724 A * | 10/1952 | Lee | | B62B 13/16 |
| | | | | 280/20 |
| 2,743,112 A * | 4/1956 | Lambert | | B62B 13/18 |
| | | | | 280/9 |
| 3,429,582 A * | 2/1969 | Embry | | B62B 13/18 |
| | | | | 280/7.12 |
| 3,653,677 A * | 4/1972 | Feser | | B60P 3/42 |
| | | | | 280/8 |
| 3,730,542 A * | 5/1973 | Chadwick | | B62B 13/18 |
| | | | | 280/9 |
| 3,874,683 A * | 4/1975 | Lawson | | B62B 13/18 |
| | | | | 280/10 |
| 3,912,290 A * | 10/1975 | Rich | | B62B 3/02 |
| | | | | 280/9 |
| 4,139,208 A * | 2/1979 | Kaley | | B62B 13/18 |
| | | | | 280/9 |
| 4,191,391 A * | 3/1980 | Dorlini | | B62B 13/18 |
| | | | | 280/11 |
| 4,251,085 A * | 2/1981 | Lageer | | B62B 13/18 |
| | | | | 280/10 |
| 4,291,891 A * | 9/1981 | Blanchette | | B62B 13/18 |
| | | | | 280/13 |
| 4,307,892 A * | 12/1981 | Miles | | B62B 13/18 |
| | | | | 280/9 |
| 4,589,668 A * | 5/1986 | Mares | | B62B 13/18 |
| | | | | 280/10 |
| 4,778,190 A * | 10/1988 | Meredith | | B62B 13/18 |
| | | | | 280/13 |
| 5,328,192 A * | 7/1994 | Thompson | | B62B 1/208 |
| | | | | 280/43.1 |
| 5,553,875 A * | 9/1996 | Ulicne | | B62B 13/16 |
| | | | | 280/15 |
| 5,911,422 A * | 6/1999 | Carpenter | | B62B 3/007 |
| | | | | 280/10 |
| 6,042,122 A * | 3/2000 | Mohr | | B62B 13/06 |
| | | | | 280/43.14 |
| 6,474,097 B2 * | 11/2002 | Treppedi | | A45C 11/20 |
| | | | | 280/30 |
| 6,824,148 B1 * | 11/2004 | Key | | B62B 19/02 |
| | | | | 280/13 |
| 7,121,560 B1 * | 10/2006 | Balzano | | B62B 9/00 |
| | | | | 280/11 |
| 7,364,170 B2 * | 4/2008 | Aittama | | B62B 13/18 |
| | | | | 280/10 |
| 7,464,943 B1 * | 12/2008 | Poggioli | | B62B 3/04 |
| | | | | 280/10 |
| 8,256,156 B1 * | 9/2012 | Burgoyne, Jr. | | A01K 97/06 |
| | | | | 206/315.11 |
| 9,260,129 B2 * | 2/2016 | Thompson | | A45C 13/262 |
| 9,340,224 B2 * | 5/2016 | Yoder | | B62B 19/00 |
| 9,540,029 B1 * | 1/2017 | Farina | | B62B 19/02 |
| 10,343,705 B1 * | 7/2019 | Farrar | | B62B 13/18 |
| 10,370,018 B1 * | 8/2019 | Maher | | B62B 13/18 |
| 2002/0095947 A1 * | 7/2002 | Treppedi | | A45C 11/20 |
| | | | | 62/457.9 |
| 2003/0025284 A1 * | 2/2003 | Edwards | | B62B 19/00 |
| | | | | 280/7.12 |
| 2003/0168371 A1 * | 9/2003 | Weimer | | B65D 81/3813 |
| | | | | 206/457 |
| 2007/0182113 A1 * | 8/2007 | McCutchen | | B62B 3/003 |
| | | | | 280/47.35 |
| 2009/0283978 A1 * | 11/2009 | Fitzgerald | | B62B 13/16 |
| | | | | 280/20 |
| 2011/0309601 A1 * | 12/2011 | Darling, III | | B62B 1/12 |
| | | | | 280/657 |
| 2012/0235370 A1 * | 9/2012 | Kirshner | | B62B 3/02 |
| | | | | 280/30 |
| 2015/0084291 A1 * | 3/2015 | Yoder | | B62B 19/00 |
| | | | | 280/8 |
| 2015/0360710 A1 * | 12/2015 | Thompson | | A63C 11/02 |
| | | | | 280/10 |
| 2016/0368518 A1 * | 12/2016 | Farina | | B62B 15/007 |
| 2017/0043643 A1 * | 2/2017 | Rambaud | | B62D 9/04 |
| 2017/0297602 A1 * | 10/2017 | Hedberg | | B62B 13/18 |
| 2019/0270475 A1 * | 9/2019 | Wilkins | | B62B 13/06 |
| 2019/0329811 A1 * | 10/2019 | Jones | | B62B 5/00 |

* cited by examiner

PORTABLE SKI COOLER AND METHOD

CROSS-REFERENCE TO RELATED APPLICATION(S)

The present application is related to and claims priority to U.S. Provisional Patent Application No. 62/637,339 filed Mar. 1, 2018, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of storage of existing art and more specifically relates to portable coolers.

RELATED ART

Standard coolers are designed to keep the internal contents cool at all times, effectively preventing food and beverage items from spoiling while outdoors. Each cooler is equipped with a pair of handles for lifting and transportation. It may be extremely difficult to transport the cooler when full. People may be unable to lift the cooler and be forced to leave favorite food and beverages at home. A suitable solution is desired.

U.S. Pat. No. 9,340,224 to Jason Yoder and Nancy Neeley relates to a mobile cooler with sled or ski attachment. The described mobile cooler with sled or ski attachment includes a cooler that is adapted for use on various terrain. The cooler includes an insulated body having an inner compartment defined by a bottom wall having side walls extending upwardly therefrom, and a lid hingedly attached at the open upper portion of the body. The body further includes a bottom portion having a pair of rear wheels. In one embodiment, the device includes a sled arrangement. In another embodiment, the device includes a ski arrangement. The ski arrangement includes a pair of skis that may be removably attached to the bottom of the cooler. The sled or ski arrangement of the present invention are preferably attached to the bottom portion of the body, and in front of the rear wheels. In this way, the present invention provides a convenient way to transport a cooler to different locations by preventing the rear wheels from getting stuck on various terrain.

SUMMARY OF THE INVENTION

In view of the foregoing disadvantages inherent in the known portable cooler art, the present disclosure provides a novel portable ski cooler and method. The general purpose of the present disclosure, which will be described subsequently in greater detail, is to provide an efficient and effective portable ski cooler and method for use.

A vehicle is disclosed herein. The vehicle (transportable item) includes a receptacle, a door, at least one door-hinge, a right-ski, a left-ski, (or other suitable means for transporting across a surface) at least one right-hinge, and at least one left-hinge. The receptacle may be a container having four sides, a bottom, and an opening which is covered by the door. The door is hinged to the receptacle by the at least one door-hinge and may be opened or closed manually. The right hinges attach the right-ski to the receptacle, and the left hinges attach the left-ski to the receptacle. In this way, each ski may be folded up against the receptacle, or turned down to be deployed and used.

According to another embodiment, a method of using the vehicle is also disclosed herein. The method of using the vehicle includes providing the above-described vehicle, deploying the skis, depositing items such as perishable items in the receptacle, pulling the vehicle, and optionally, folding the skis against the receptacle and pulling the vehicle without use of the skis.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a portable ski cooler and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a portable cooler and more particularly to a portable ski cooler and method as used to improve the transportation of perishable contents over a wide variety of terrain(s).

Generally, the portable ski cooler may be a vehicle having features to more conveniently and effectively transport items, such as perishable foods and beverages, over a variety of terrain(s). The vehicle has sleds (skis) attached to the bottom, enabling the cooler to slide along rough terrain such as grass, gravel, sand, and more. This effectively eliminates the need to lift and carry heavy coolers filled with numerous food and beverage items from a vehicle to a campsite, beach site, tailgate area, etc. Rather, the vehicle can simply be pulled, even in situations where a wheeled cooler would not be suitable. The device may also include a set of wheels which can be used alternatively to the sleds, offering multiple methods of transportation for the user. As designed, the vehicle allows the sleds to be folded along a hinge which moves between a deployed-position parallel to the ground and a stored position alongside the cooler, keeping the sleds out of the way when storing the cooler. The vehicle saves extensive amounts of time and effort when transporting cold food and refreshments to numerous areas.

The vehicle may take the structure of an improved cooler equipped with a set of integrated skis or sleds. The skis/sleds enable the cooler to slide along rough or uneven terrain for convenient transportation. The cooler can be comprised of a rectangular unit with an open interior, a set of wheels, hinges, and foldable sleds. Each sled can be folded on the hinge which moves between a deployed-position parallel to the ground and a stored position alongside the cooler.

Users can choose between the wheels and sleds for transportation depending on the final destination of the cooler. The sleds are designed to offer convenience, enabling the cooler to be pulled along sand, gravel, etc. with minimal effort required. The interior is insulated and keeps food/beverages cool for an extended period of time. The vehicle can be constructed using plastic, wood, metal, and other suitable materials. The coolers may be available in various sizes in order to accommodate all user needs and preferences.

A ski is understood in general use to mean a long, narrow piece of rigid or semi-rigid material, which is typically pointed and turned up at the front, and is intended to be fastened under a vehicle, wearer, or other object for gliding over the ground or over snow. The disclosed skis may be laminated or unitary. The may include various waterproofing or surface finishing methods. Materials may include wood, plastic, aluminum, composites, or other materials in various embodiments.

Referring now more specifically to the drawings by numerals of reference, there is shown in FIGS. 1-4, various views of a vehicle 100.

Figure 1:
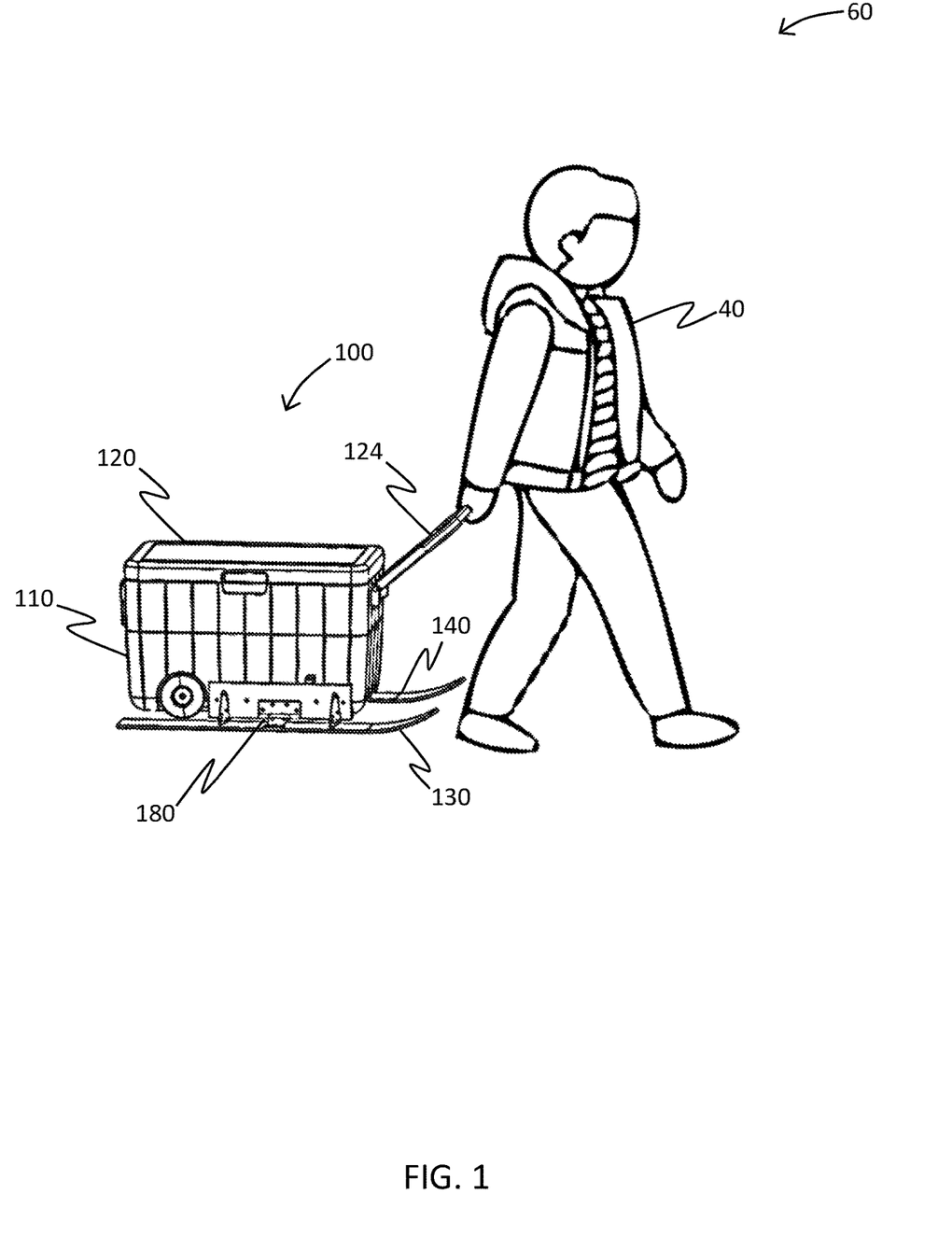
FIG. 1 is a perspective view of the vehicle during an 'in-use' condition, according to an embodiment of the disclosure.

FIG. 1 shows a vehicle 100 according to an embodiment of the present disclosure. Here, the vehicle may be beneficial for use by a user 40 to transport perishable contents over a wide variety of terrain. As illustrated, the vehicle 100 may include receptacle 110, door 120 pivotably connected to receptacle 110, right-ski 130, left-ski 140, and handle 124. As shown, door 120 is in closed-position 60. Right-ski 130 and left-ski 140 are affixed to receptacle 110 and enable vehicle 100 to slide along the ground when pulled by user 40 using handle 124. Handle 124 may be pivotably attached to receptacle 110, being configured to enable vehicle 100 to be pulled by user 40. Handle 124 may be hingedly affixed to receptacle 110, such that it can be stowed alongside receptacle 110 easily or raised to be used as a pulling device. First-lock 180 may be affixed to receptacle 110, being proximal to right-ski 130 and being able to selectively engage right-ski 130.

Figure 2A:
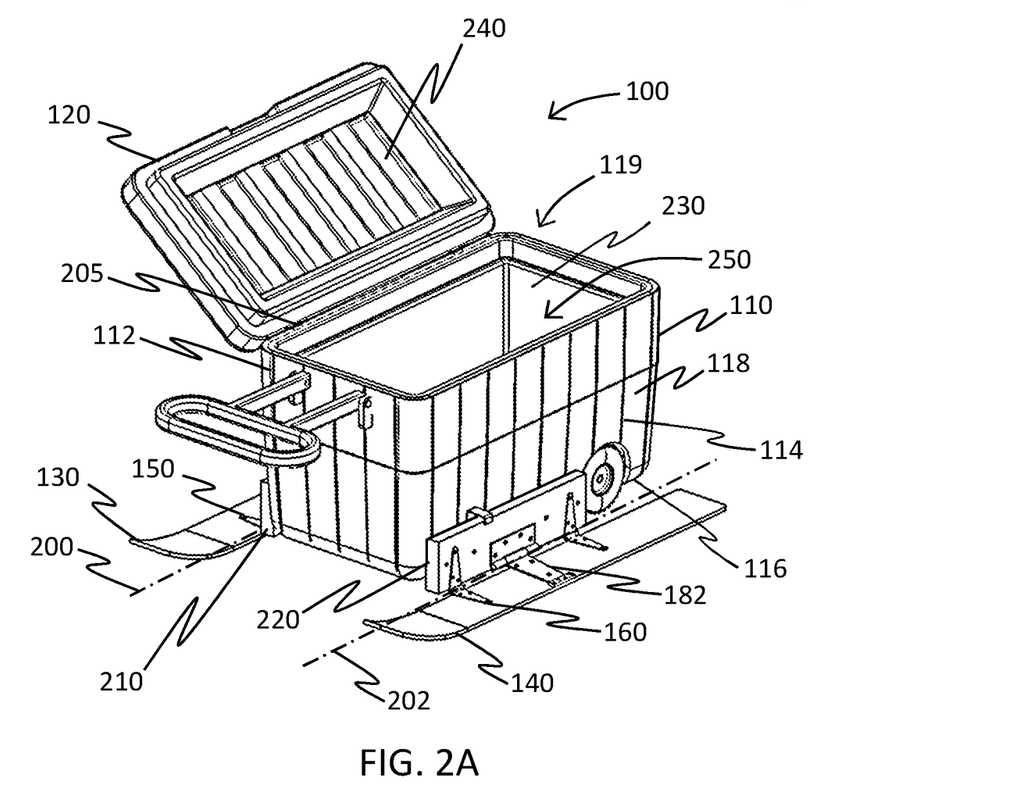
FIG. 2A is a perspective view of the vehicle of FIG. 1 with the lid open, according to an embodiment of the present disclosure.
Figure 2B:
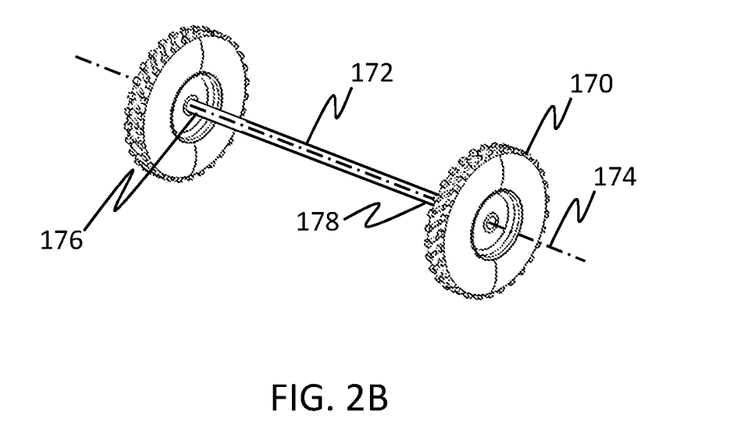
FIG. 2B is a view of the axle of the vehicle of FIG. 1, according to an embodiment of the present disclosure.

FIGS. 2A and 2B show the vehicle 100 of FIG. 1, according to an embodiment of the present disclosure. As above, the vehicle 100 may include receptacle 110, door 120, right-ski 130, and left-ski 140. Vehicle 100 may also include at least two wheels 170 pivotably attached to receptacle 110. Additionally, vehicle 100 may also include axle 172 affixed to receptacle 110. Axle 172 may itself include axle-axis 174, left-end 178, and right-end 176, such that right-end 176 is distal to left-end 178. At least two wheels 170 may be oriented such that they are able to roll in the same direction that vehicle 100 may be pulled by handle 124 (FIG. 1). Each of at least two wheels 170 may be affixed to axle 172: one to left-end 178, and one to right-end 176. In some embodiments, they may be each rigidly affixed to axle 172, and axle 172 may be able to turn relative to receptacle 110. Alternatively, at least two wheels 170 may turn freely upon axle 172.

Receptacle may be further defined by bottom 116 and four sides 118. Four sides 118 may be oriented rectangularly, each side being normal to each adjacent side. Opening 119 may be opposite bottom 116 and may be selectively covered by door 120. As illustrated, door 120 is in open-position 70.

Receptacle 110 may also include insulating-liner 230, insulating-layer 240, and insulated internal-cavity 250. Insulating-liner 230 may line bottom 116 and four sides 118. Door 120 may incorporate insulating-layer 240. Closing door 120 to receptacle 110 so that insulating-layer 240 and insulating-liner 230 abut may enclose and define insulated internal-cavity 250. Door-hinge 205 may pivotably couple door 120 to receptacle 110.

Right-ski 130 and left-ski 140 may each be constructed of polymer, aluminum, or other materials in various embodiments. At least one right-hinge 150 may pivotably attach right-ski 130 to right-side 112 of receptacle 110, and at least one left-hinge 160 may likewise pivotably attach left-ski 140 to left-side 114 of receptacle 110.

Receptacle 110 may itself have right-side 112 and left-side 114, and may yet further be defined by bottom 116, four sides 118, and opening 119. Essentially, in the preferred embodiment, receptacle 110 is more or less 3D rectangular. Receptacle 110 may have, however, rounded or chamfered corners, or other modifying structural features. Door 120 may be shaped substantially rectangularly and may be able to selectively cover opening 119 of receptacle 110 and align with four sides 118 of receptacle 110. Essentially, user 40 (FIG. 1) may be able to open and close door 120 relative to receptacle 110 to access or shut an interior region of receptacle 110. This interior region may be substantially rectangular as well. At least one door-hinge 205 may be pivotably attach door 120 to receptacle 110, such that door 120 covers opening 119 of receptacle 110 in closed-position 60 (FIG. 1) and exposes opening 119 of receptacle 110 in open-position 70.

Receptacle 110 may further include right-spacer 210 and left-spacer 220, each being configured to distance right-ski 130 and left-ski 140 relative from each other, such that at least one right-hinge 150 is affixed to right-spacer 210, and at least one left-hinge 160 is affixed to left-spacer 220. Right-spacer 210 and left-spacer 220 may each comprise rigid rectangular bodies. At least one right-hinge 150 may be defined by right-axis 200, and at least one left-hinge 160 may be defined by left-axis 202. Second-lock 182 may be disposed on left-spacer 220 as shown.

Figure 3:
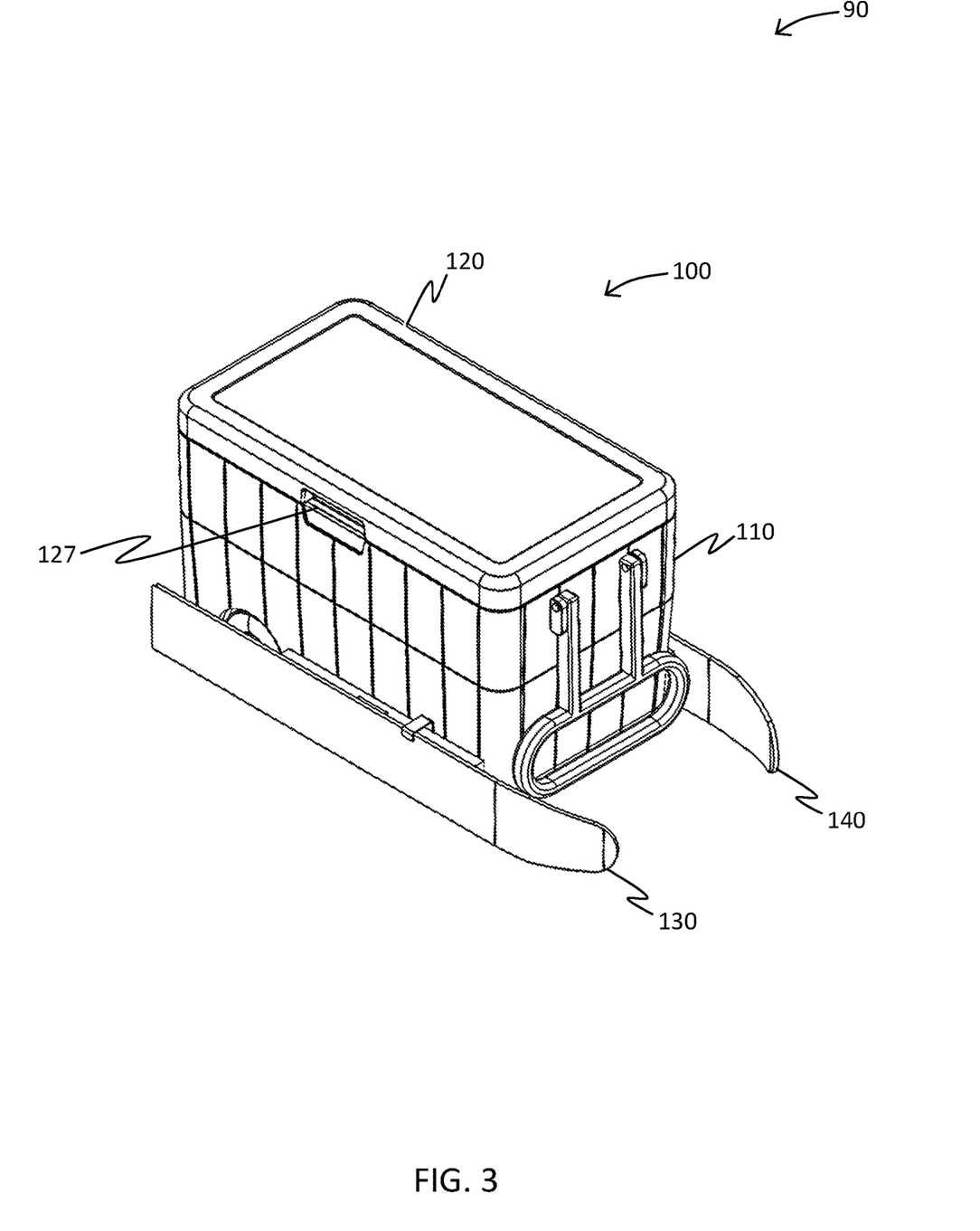
FIG. 3 is a perspective view of the vehicle of FIG. 1 with the sleds in an undeployed position, according to an embodiment of the present disclosure.

FIG. 3 is a perspective view of the vehicle 100 of FIG. 1, according to an embodiment of the present disclosure. Latch 127 may be provided to selectively fasten door 120 to receptacle 110. Undeployed-position 90 positions right-ski 130 above right-axis 200 (FIG. 2), and also places left-ski 140 above left-axis 202 (FIG. 2).

Figure 4:
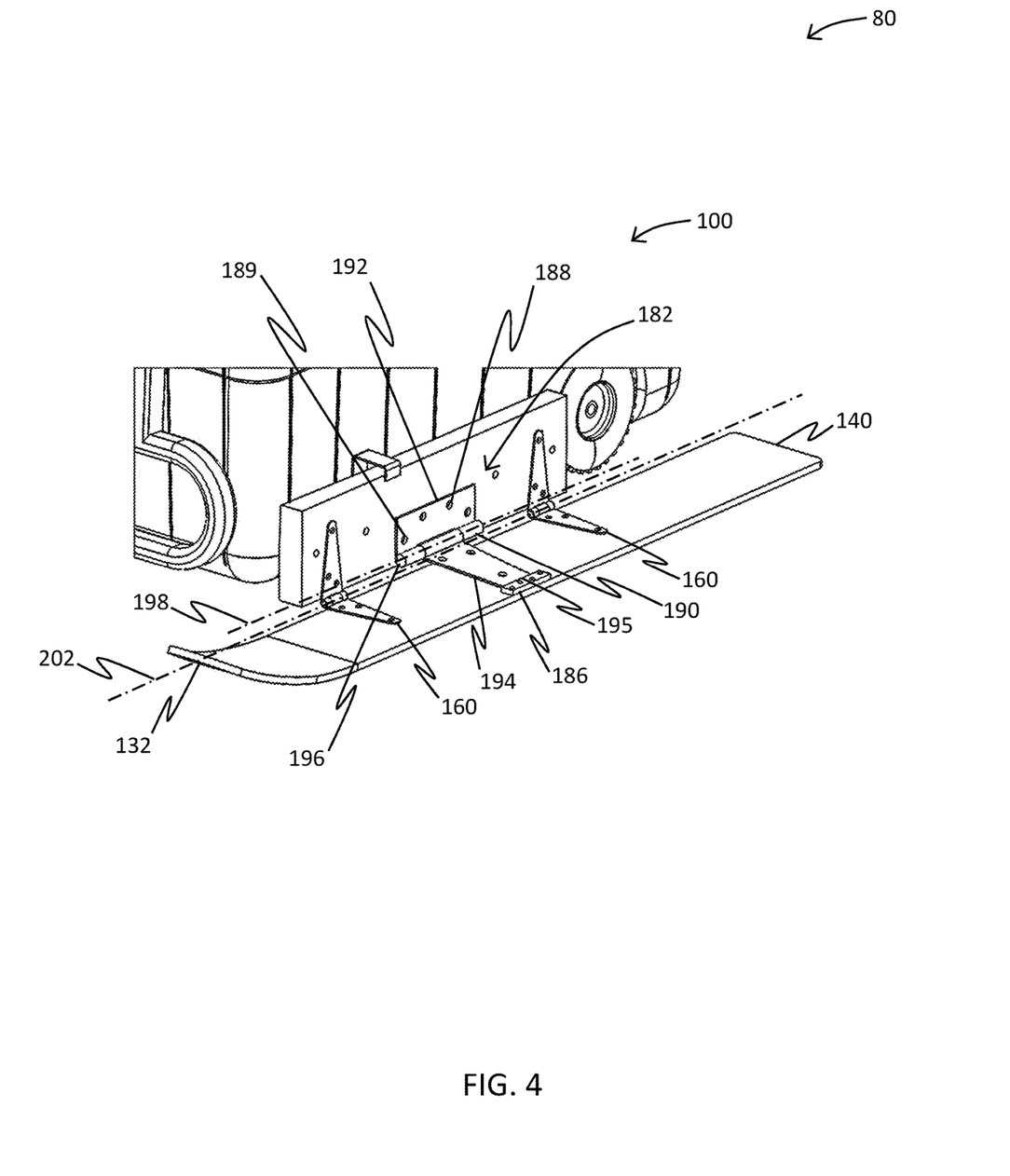
FIG. 4 is a perspective view of the vehicle of FIG. 1 with the sleds in a deployed position, according to an embodiment of the present disclosure.

FIG. 4 is a perspective view of the vehicle of FIG. 1, according to an embodiment of the present disclosure. Right-ski 130 and left-ski 140 may each be movable between deployed-position 80 and undeployed-position 90 (FIG. 3).

Vehicle 100 may also include first-lock 180 (FIG. 1) and second-lock 182. First-lock 180 (FIG. 1) may be configured to maintain right-ski 130 (FIG. 1) in deployed-position 80 when engaged, and second-lock 182 may likewise be configured to maintain left-ski 140 in deployed-position 80 when engaged. First-lock 180 (FIG. 1) and second-lock 182 may mirror each other. First-lock 180 (FIG. 1) and second-lock 182 may each include lock-hinge 190 and abutment 186 as shown. Lock-hinge 190 may include cooler-leaf 192, lock-leaf 194 (which itself may include tip 195), and pin 196 (which itself may include or be defined by lock-axis 198). Lock-hinge 190 is arranged in such a way that that pin 196 pivotably fastens cooler-leaf 192 to lock-leaf 194 and acts as fulcrum 184 for enabling rotation of lock-leaf 194 relative to cooler-leaf 192. Each leaf may include barrels for pin 196 to pass through. Pin 196 may be retained by fasteners or by friction. There may be an abutment 186 on either ski to engage the corresponding lock. Abutment 186 may be rigidly affixed to right-ski 130 (FIG. 1) or alternatively left-ski 140 (depending on the side in question), with abutment 186 being positioned such that when the corresponding ski is in deployed-position 80, lock-leaf 194 may be turned down such that tip 195 of lock-leaf 194 rests against abutment 186, and the impingement of abutment 186 against tip 195 of lock-leaf 194 prevents the corresponding ski from returning to the undeployed-position 90 (FIG. 3) until lock-leaf 194 is lifted and removed from abutment 186. Vehicle 100 may also include at least one leaf-fastener 188, wherein cooler-leaf 192 has at least one fastening-aperture 189, and at least one leaf-fastener 188 passes through at least one fastening-aperture 189 and affixes cooler-leaf 192 to receptacle 110. In some embodiments, a retention device for disengaging and holding tip 195 may be provided. Various suitably equivalent fastening means may be employed.

Right-ski 130 and left-ski 140 may each include upturned-nose 132. At least one right-hinge 150 may be defined by right-axis 200 (FIG. 2), and at least one left-hinge 160 may be defined by left-axis 202. Lock-axis 198 of each of first-lock 180 (FIG. 1) and second-lock 182 is preferably parallel but is not coincidental with either right-axis 200 (FIG. 2) or left-axis 202. This configuration ensures that each of first-lock 180 (FIG. 1) and second-lock 182 cannot rotate freely with at least one right-hinge 130 or at least one left-hinge 140, as such a configuration would be unsuitable for the locking function. Preferably, first-lock 180 and second-lock 182 each are at an obtuse angle when in deployed-position 80. When in deployed-position 80, and when first-lock 180 (FIG. 1) and second-lock 182 are engaged, right-ski 130 (FIG. 1) and left-ski 140 are coplanar to each other. When in undeployed-position 90 (FIG. 3), such that first-lock 180 (FIG. 1) and second-lock 182 are not engaged, right-ski 130 (FIG. 1) and left-ski 140 may be parallel to each other. Retention devices may be provided to retain each of right-ski 130 (FIG. 1) and left-ski 140 in undeployed-position 90 (FIG. 3). In some embodiments, at least one right-hinge 150 (FIG. 2) and at least one left-hinge 160 may be each mechanically restricted to ninety degrees of travel.

Figure 5:
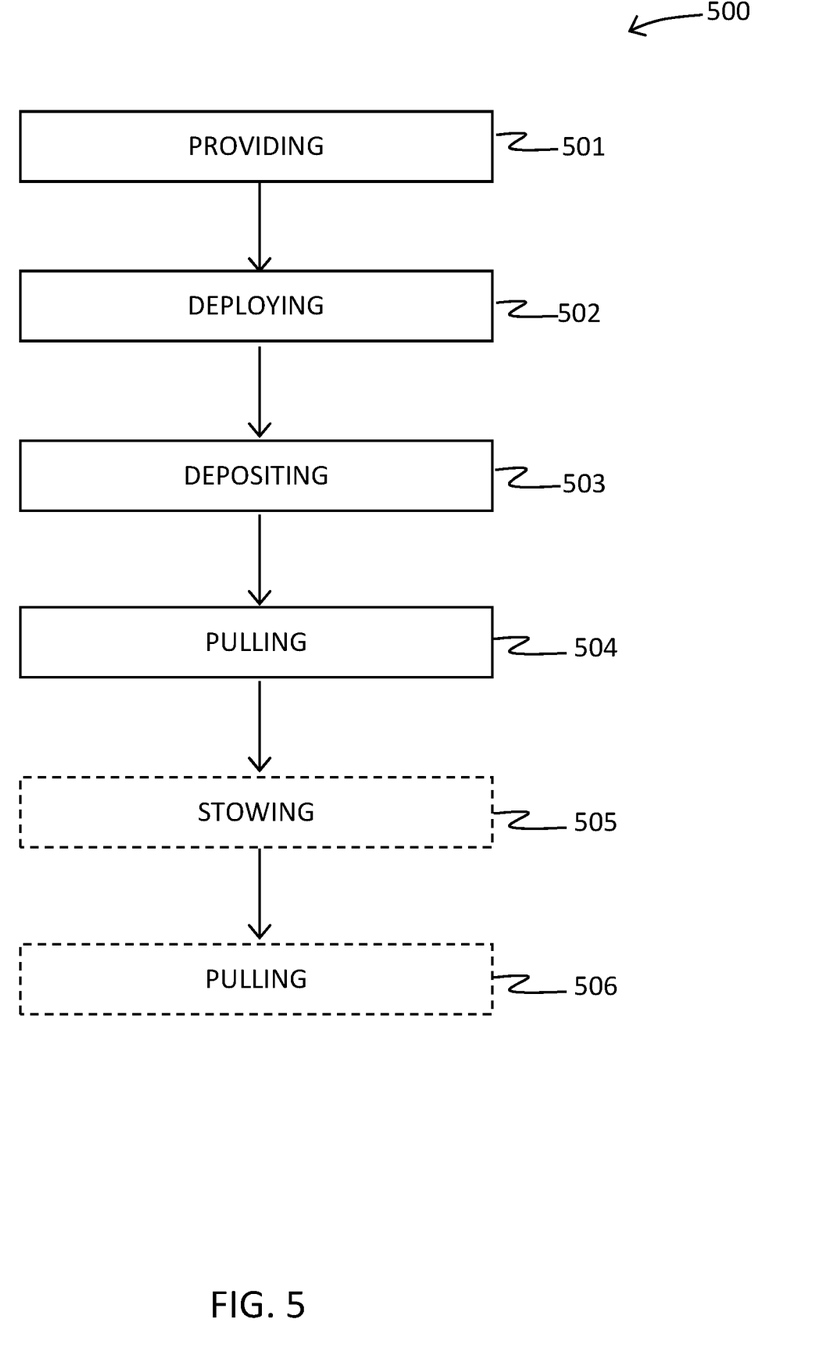
FIG. 5 is a flow diagram illustrating a method of use for transporting perishable contents over a wide variety of terrain, according to an embodiment of the present disclosure.

FIG. 5 is a flow diagram illustrating a method for transporting perishable contents over a wide variety of terrain 500, according to an embodiment of the present disclosure. In particular, the method for transporting perishable contents over a wide variety of terrain 500 may include one or more components or features of the vehicle 100 as described above. As illustrated, the method for transporting perishable contents over a wide variety of terrain 500 may include the steps of: step one 501, providing a vehicle for containing and transporting items, the vehicle comprising: a receptacle having a right-side and a left-side, the receptacle being further defined by a bottom, four sides, and an opening, a door, the door being substantially rectangular, the door being able to selectively cover the opening of the receptacle and align with the four sides of the receptacle, at least one door-hinge pivotably attaching the door to the receptacle, such that the door covers the opening of the receptacle in a closed-position and exposes the opening of the receptacle in an open-position, a right-ski and a left-ski each movable between a deployed-position and an undeployed-position; at least one right-hinge pivotably attaching the right-ski to the right-side of the receptacle; and at least one left-hinge pivotably attaching the left-ski to the left-side of the receptacle; two 502, deploying the right-ski and the left-ski by rotating the right-ski and the left-ski outwardly from the receptacle; step three 503, depositing items within the receptacle; step four 504, pulling the vehicle with the items therein; step six 505, stowing the right-ski and the left-ski by rotating them upwardly against the receptacle; and step six 506, pulling the vehicle with the items therein without the assistance of the right-ski and the left-ski.

It should be noted that steps 505-506 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for transporting perishable contents over a wide variety of terrain are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A vehicle for containing and transporting items, the vehicle comprising:
   a receptacle having a right-side and a left-side, the receptacle being further defined by a bottom, two sides, and an opening;
   a door, the door being substantially rectangular, the door being able to selectively cover the opening of the receptacle and align with the four sides of the receptacle;

at least one door-hinge pivotably attaching the door to the receptacle, such that the door covers the opening of the receptacle in a closed-position and exposes the opening of the receptacle in an open-position;

a right-ski and a left-ski each movable between a deployed-position and an undeployed-position;

at least one right-hinge pivotably attaching the right-ski to the right-side of the receptacle;

at least one left-hinge pivotably attaching the left-ski to the left-side of the receptacle;

a first-lock configured to maintain the right-ski in the deployed-position when engaged;

a second-lock configured to maintain the left-ski in the deployed-position when engaged;

wherein the first-lock and the second lock each comprise a hinge including
a cooler-leaf,
a lock-leaf having a tip, and
a pin having a lock-axis, such that the pin pivotably fastens the cooler-leaf to the lock-leaf and acts as a fulcrum for rotation of the lock-leaf relative to the cooler-leaf; and an abutment affixed to the right-ski and alternatively the left-ski, wherein the abutment is positioned such that when the right-ski and alternatively the left-ski is in the deployed-position, the lock-leaf may be turned down such that the tip of the lock-leaf rests against the abutment, and the impingement of the abutment against the tip of the lock-leaf prevents the right-ski and alternatively the left-ski from returning to the undeployed-position until the lock-leaf is removed from the abutment.

2. The vehicle of claim 1, further comprising at least two wheels pivotably attached to the receptacle.

3. The vehicle of claim 2, further comprising an axle affixed to the receptacle, the axle including
an axle-axis,
a left-end, and
a right-end distal to the left-end, and
wherein the at least two wheels are affixed to the axle, one to the left-end, and one to the right-end.

4. The vehicle of claim 1, further comprising at least one leaf-fastener, wherein the cooler-leaf has at least one fastening-aperture, and the at least one leaf-fastener passes through the at least one fastening-aperture and affixes the cooler-leaf to the receptacle.

5. The vehicle of claim 1, wherein the at least one right-hinge further comprises a right-axis, and the at least one left-hinge further comprises a left-axis, and the lock-axis is parallel but not coincidental with either the right-axis or the left-axis.

6. The vehicle of claim 1, wherein the right-ski and the left-ski each include an upturned-nose.

7. The vehicle of claim 1, wherein the receptacle further includes a right-spacer and a left-spacer each configured to distance the right-ski and the left-ski relative from each other, such that the at least one right-hinge is affixed to the right-spacer, and the at least one left-hinge is affixed to the left-spacer.

8. The vehicle of claim 7, wherein the right-spacer and the left-spacer each comprise rigid rectangular bodies.

9. The vehicle of claim 5, wherein the undeployed-position as corresponds to the right-ski places the right-ski above the right-axis, and the undeployed-position as corresponds to the left-ski places the left-ski above the left-axis.

10. The vehicle of claim 1, wherein the in the deployed-position, and when the first-lock and the second-lock are engaged, the right-ski and the left-ski are coplanar to each other.

11. The vehicle of claim 1, wherein the in the undeployed-position, such that the first-lock and the second-lock are not engaged, the right-ski and the left-ski are parallel to each other.

12. The vehicle of claim 1, wherein the at least one right-hinge and the at least one left-hinge are each mechanically restricted to ninety degrees of travel.

13. The vehicle of claim 1, wherein the receptacle further comprises an insulating-liner, the insulating-liner lining the bottom and the four sides, and wherein the door further comprises an insulating-layer, such that the insulating-liner and the insulating-layer define an insulated internal-cavity when the door is closed to the receptacle.

14. The vehicle of claim 1, wherein the right-ski and the left-ski are each constructed of polymer.

15. The vehicle of claim 1, wherein the right-ski and the left-ski are each constructed of aluminum.

16. A portable ski cooler vehicle comprising:

a receptacle having a right-side and a left-side, the receptacle being further defined by a bottom, two sides, and an opening;

a door, the door being substantially rectangular, the door being able to selectively cover the opening of the receptacle and align with the four sides of the receptacle;

at least one door-hinge pivotably attaching the door to the receptacle, such that the door covers the opening of the receptacle in a closed-position and exposes the opening of the receptacle in an open-position;

a right-ski and a left-ski each movable between a deployed-position and an undeployed-position;

at least one right-hinge pivotably attaching the right-ski to the right-side of the receptacle; and at least one left-hinge pivotably attaching the left-ski to the left-side of the receptacle;

at least two wheels pivotably attached to the receptacle;

an axle affixed to the receptacle, the axle including
an axle-axis,
a left-end, and
a right-end distal to the left-end, a first-lock and a second-lock, the first-lock being configured to maintain the right-ski in the deployed-position when engaged, and the second-lock being configured to maintain the left-ski in the deployed-position when engaged, each of the first-lock and the second-lock comprising
a hinge including
a cooler-leaf,
a lock-leaf having a tip, and
a pin having a lock-axis, such that the pin pivotably fastens the cooler-leaf to the lock-leaf and acts as a fulcrum for rotation of the lock-leaf relative to the cooler-leaf;
and an abutment, the abutment being affixed to the right-ski and alternatively the left-ski, wherein the abutment is positioned such that when the right-ski and alternatively the left-ski is in the deployed-position, the lock-leaf may be turned down such that the tip of the lock-leaf rests against the abutment, and the impingement of the abutment against the tip of the lock-leaf prevents the right-ski and alternatively the left-ski from returning to the undeployed-position until the lock-leaf is removed from the abutment;

at least one leaf-fastener, wherein the cooler-leaf has at least one fastening-aperture, and the at least one leaf-fastener passes through the at least one fastening-aperture and affixes the cooler-leaf to the receptacle;

wherein the at least one right-hinge further comprises a right-axis, and the at least one left-hinge further comprises a left-axis, and the lock-axis is parallel but not coincidental with either the right-axis or the left-axis;

wherein the right-ski and the left-ski each include an upturned-nose;

wherein the receptacle further includes a right-spacer and a left-spacer each configured to distance the right-ski and the left-ski relative from each other, such that the at least one right-hinge is affixed to the right-spacer, and the at least one left-hinge is affixed to the left-spacer;

wherein the right-spacer and the left-spacer each comprise rigid rectangular bodies;

wherein the undeployed-position as corresponds to the right-ski places the right-ski above the right-axis, and the undeployed-position as corresponds to the left-ski places the left-ski above the left-axis;

wherein the in the deployed-position, and when the first-lock and the second-lock are engaged, the right-ski and the left-ski are coplanar to each other;

wherein the in the undeployed-position, such that the first-lock and the second-lock are not engaged, the right-ski and the left-ski are parallel to each other;

wherein the at least one right-hinge and the at least one left-hinge are each mechanically restricted to ninety degrees of travel;

wherein the at least two wheels are affixed to the axle, one to the left-end, and one to the right-end; and wherein the receptacle further comprises an insulating-liner, the insulating-liner lining the bottom and the four sides, and wherein the door further comprises an insulating-layer, such that the insulating-liner and the insulating-layer define an insulated internal-cavity when the door is closed to the receptacle.

17. A method of transporting items comprising the steps of:

providing a vehicle comprising:
    a receptacle having a right-side and a left-side, the receptacle being further defined by a bottom, two sides, and an opening;
    a door, the door being substantially rectangular, the door being able to selectively cover the opening of the receptacle and align with the four sides of the receptacle;
    at least one door-hinge pivotably attaching the door to the receptacle, such that the door covers the opening of the receptacle in a closed-position and exposes the opening of the receptacle in an open-position;
    a right-ski and a left-ski each movable between a deployed-position and an undeployed-position;
    at least one right-hinge pivotably attaching the right-ski to the right-side of the receptacle;
    at least one left-hinge pivotably attaching the left-ski to the left-side of the receptacle;
    a first-lock configured to maintain the right-ski in the deployed-position when engaged;
    a second-lock configured to maintain the left-ski in the deployed-position when engaged;
    wherein the first-lock and the second lock each comprise a hinge including
        a cooler-leaf,
        a lock-leaf having a tip, and
        a pin having a lock-axis,
    such that the pin pivotably fastens the cooler-leaf to the lock-leaf and acts as a fulcrum for rotation of the lock-leaf relative to the cooler-leaf; and
    an abutment affixed to the right-ski and alternatively the left-ski, wherein the abutment is positioned such that when the right-ski and alternatively the left-ski is in the deployed-position, the lock-leaf may be turned down such that the tip of the lock-leaf rests against the abutment, and the impingement of the abutment against the tip of the lock-leaf prevents the right-ski and alternatively the left-ski from returning to the undeployed-position until the lock-leaf is removed from the abutments;

deploying the right-ski and the left-ski by rotating the right-ski and the left-ski outwardly from the receptacle;

depositing items within the receptacle; and pulling the vehicle.

18. The method of claim 17, further comprising the steps of stowing the right-ski and the left-ski by rotating them upwardly against the receptacle; and pulling the vehicle with the items therein without the assistance of the right-ski and the left-ski.

* * * * *